(12) United States Patent
Sweetland et al.

(10) Patent No.: US 9,478,834 B2
(45) Date of Patent: Oct. 25, 2016

(54) FIRE SUPPRESSANT BATTERY PACK

(71) Applicant: Electrochem Solutions, Inc., Clarence, NY (US)

(72) Inventors: Todd E. Sweetland, Wilsonville, OR (US); Brian Robert Peterson, Norton, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 556 days.

(21) Appl. No.: 13/870,045

(22) Filed: Apr. 25, 2013

(65) Prior Publication Data

US 2013/0288083 A1    Oct. 31, 2013

Related U.S. Application Data

(60) Provisional application No. 61/639,187, filed on Apr. 27, 2012.

(51) Int. Cl.

| | | |
|---|---|---|
| *H01M 10/50* | (2006.01) | |
| *H01M 10/659* | (2014.01) | |
| *H01M 2/02* | (2006.01) | |
| *H01M 2/04* | (2006.01) | |
| *H01M 2/10* | (2006.01) | |
| *H01M 2/06* | (2006.01) | |

(52) U.S. Cl.
CPC ....... *H01M 10/5089* (2013.01); *H01M 2/0277* (2013.01); *H01M 2/0287* (2013.01); *H01M 2/0478* (2013.01); *H01M 2/1094* (2013.01); *H01M 2/06* (2013.01)

(58) Field of Classification Search
None
See application file for complete search history.

(56) References Cited

U.S. PATENT DOCUMENTS

| | | |
|---|---|---|
| 3,209,837 A | 10/1965 | Freedman |
| 4,661,398 A | 4/1987 | Ellis |
| 5,002,843 A | 3/1991 | Cieslak et al. |
| 6,627,344 B2 | 9/2003 | Kang et al. |
| 7,476,468 B1 | 1/2009 | Lam et al. |
| 7,736,799 B1 | 6/2010 | Hermann et al. |
| 2009/0233176 A1* | 9/2009 | Kita .................... H01M 4/131 429/231.95 |
| 2009/0280400 A1 | 11/2009 | Tsukamoto |
| 2011/0183187 A1 | 7/2011 | Wenzl et al. |

FOREIGN PATENT DOCUMENTS

JP    2001076759    * 3/2001

OTHER PUBLICATIONS

JP 2001076759—Translation.*
Darcy et al., "Lithium-Ion Cell PTC Limitations and Solutions for High Voltage Battery Applications" (2003)—2 pages.

* cited by examiner

*Primary Examiner* — Ladan Mohaddes
(74) *Attorney, Agent, or Firm* — Kevin D. McCarthy; Michael F. Scalise (57) ABSTRACT

A fire suppressant battery system has a battery pack, a non-conductive fire suppressant liquid in a fire suppressant bladder, and a fire suppressant protective layer. The bladder melts at a temperature above the battery pack's desired operating condition, has a cavity for receiving the liquid and contacts at least a section of the battery pack. The protective layer is positioned onto a portion of the fire suppression bladder's exterior surface that is on the opposite side to that which contacts the battery pack.

22 Claims, 4 Drawing Sheets

FIRE SUPPRESSANT BATTERY PACK

CROSS-REFERENCE TO RELATED APPLICATIONS

This application claims priority to U.S. provisional patent application Ser. No. 61/639,187; filed on Apr. 27, 2012.

FIELD OF THE INVENTION

The present invention is directed to suppressing a fire, excess heat, and shrapnel damage from a battery or battery pack (collectively referred to as a battery pack).

BACKGROUND OF THE PRESENT INVENTION

Electrochemical cells based on lithium and other high energy materials are sensitive to how they are used. If the battery cell is mishandled it can lead to an internal short or external short, that can result in fire or sparks, that could further lead to an explosion. The problem is that most components used in association with an electrochemical cell are designed to protect the battery from such results ever occurring; there are few external measures that can be used to minimize the damage when fire or sparks do occur.

Electrochemical cells can have internal mechanisms, such as temperature activated separator paper, that shut the electrochemical cell down if over heated. As expressed by Darcy et al. in "Lithium-Ion Cell PTC Limitations and Solutions for High Voltage Battery Applications" (2003), many commercial, cylindrical lithium-ion battery cell designs are equipped with a positive thermal coefficient (PTC) current limiting switch to provide hazard protection against short circuits external to the cell. This PTC current limiting switch is a thin annulus consisting of a specially irradiated polyethylene laminated with a metal on both sides. When exposed to an overcurrent situation, this normally conductive polymer heats up and changes phases to become several orders of magnitude more resistive. Once the short is removed, the PTC cools down and returns to its electrically conductive state. This device has been a very effective method of providing reliable short circuit protection in low voltage battery assemblies.

However, when 8 or more fully charged cells in series are shorted, the first PTC that trips in the series strings can experience a large voltage drop that exceeds its voltage rating (~30V) and will cause it to fail. Such tests performed at various research facilities have revealed that sparks and flames accompany those failures. The PTC usually fails shorted, becoming a charred substance. In a large series string, then the first cell PTC that fails shorted will transmit the problem to the next PTC to trip and the cascading series of flames and sparks will follow. This occurs because slight manufacturing variances in the resistance and trip points of the PTC prevent them from tripping in unison to distribute the large short circuit voltage drop among them.

A simple electrical protection scheme using bypass diodes is proposed to protect the battery cell PTCs from overvoltage conditions. The idea consists of placing a bypass diode in parallel with groups of 6 cells in series. During a short, the diode in parallel with the first PTC to trip will shunt the current away from the PTC until other cell PTCs in other series group of cells trip and share the voltage drop from the short circuit condition. This scheme protects the PTC from large voltage drop surges until the drop can be equitably distributed along the long series string of cells. That electrical solution, however, fails to address how to suppress flames and sparks when such deleterious events do occur.

Other cells have a thermal cutout (TCO) fuse device that is permanent and essentially operates like the above-identified PTC. The problem with a TCO device is that it protects against an electrical issue, and not against a mechanical issue such as a tab sticking into the can or an internal short being created. That electrical TCO solution, however, fails to address how to suppress flames and sparks when such deleterious events do occur.

Electrochemical cell vendors often use a vent or a weakened point on the battery cell's casing to controllably break open the casing when the electrochemical cell's internal pressure reaches a predetermined threshold that is too high for the cell's safe operation. The above-identified venting solution inhibits the cell from an uncontrolled electrical failure. That venting solution does not inhibit flames or sparks from shooting from the cell. Thus, the venting solution does nothing to minimize the potential flame or spark damage.

In U.S. Pat. No. 7,476,468; Lam discloses a flame retardant battery. The battery has a case and within the case is an electrode assembly. The electrode assembly has an electrolyte. Surrounding—from the right side, the left side, below, above or combinations thereof (col. 9, lines 22 to 51)—the electrode assembly and within the case is a fire suppressant material. Lam expresses the fire suppressant material is "primarily located outside" and is "substantially excluded from" the electrode assembly. Lam admits the fire suppressant material and electrolyte material may mix through surface tension and the curvature of a meniscus of the two liquids. Accordingly, there is no structural barrier between the fire retardant material and the electrolyte. Such potential interaction between the electrolyte and the fire suppressant material, when the battery cell is operating, is undesirable for the simple reason that the specific electrolyte may be adversely affected.

Tsukamoto, in US published application serial number 2009/0280400, discloses a battery pack contained in a case. Within the case is a porous medium that has openings to receive the battery pack. (See paragraphs 0018 to 0021) In addition to holding the battery pack, the porous medium can also be saturated with a flame retardant. (See paragraph 0029) Tsukamoto acknowledges this embodiment has disadvantages— "the liquid can conduct electrical energy between different locations in the battery pack . . . [thus] self-discharge can adversely affect the cycling performance of the battery pack . . . . However, electrically insulating the liquid from electrical components in the battery pack becomes more difficult when the liquid is outside the pores of the one or more porous medium." (See paragraph 0030). Obviously in view of Tsukamoto's teachings, Tsukamoto teaches against a fire retardant contacting a battery cell but elects otherwise—having the flame retardant directly contact the battery cell—to inhibit potential flames and sparks.

Cieslak, in U.S. Pat. No. 5,002,843, discloses that Kevlar® brand aramid is a known "battery separator [that] physically separates the positive and negative terminals of a given battery", "has superior resistance to most chemical reagents . . . , has an outstanding stability to heat, and retains as much as 95% of strength after exposure to temperatures of 500° F., . . . also exhibits good stability to temperatures above that level, KEVLAR [® brand aramid] is also a flame retardant material", and "has superior mechanical strength, and better chemical resistance. Thus, KEVLAR [® brand aramid] possesses many advantages over other materials, especially in regard to safety concerns." Cieslak's teachings disclose that Kevlar® brand aramid is an excellent separator component used between a electrochemical cell's positive and negative terminals, and is a known fire suppressant material.

A fire-extinguishing system for a home range is disclosed in the Freedman U.S. Pat. No. 3,209,837 (issued Oct. 5, 1965). Freedman discloses an "inexpensive heat resistant material such as metal foil having a powder material, such as baking soda, adapted to extinguish a fire, loosely retaining with the convolution of the roll, the roll being anchored to the hood structure at the outer end of the sheet so that when released, it unwinds in a downward direction to disperse a fog of the powder material over the area which the hood overlies and thereby extinguish the fire which may have ignited at such area." (Col. 1, lines 24 to 32) The sheet material is maintained in a roll by a heat responsive element, like a fusible link. Upon melting of the fusible link, the sheet unrolls, thereby depositing the fire-extinguishing powder onto the home range. Such a fire-extinguishing system is applicable when there is a sufficient space positioned between the fire-extinguishing system and the burning object to allow the heat resistant material to unroll. A fire suppressant system for battery cells normally does not have such available space since battery cells are often used in locations having restrictive space.

Ellis; in U.S. Pat. No. 4,661,398; expressed that Kevlar, at least as early as 1987, was made with an adhesive. In particular, Ellis wrote in the abstract, "The coating may be used alone, or in the form of an impregnated sheet of woven or non-woven fabric made from fiberglass, carbon, aramid ("Kevlar"), quartz, polyester, nylon, or other natural or synthetic or inorganic fibers. The impregnated fabric adds tensile strength and flexural modulus to the laminate and may be used as the bonding agent (adhesive) alone or in combination with the currently used adhesives (e.g. phenol-formaldehyde, urea formaldehyde, resorcinol, melamine, melamine urea, urea, etc.)."

The above-identified information confirms that liquid flame retardants and Kevlar brand aramid are materials that have been used in association with electrochemical cells to provide flame retardant properties. In particular, some liquid flame retardants can physically surround and contact (a) an electrochemical cell's electrolyte and (b) the exterior and interior surface of an electrochemical cell's casing even when such contact provides undesirable electrochemical cell characteristics. In addition, Kevlar brand aramid with adhesive backing was known prior to filing this application. As evident from the above information, it is common practice with electrochemical cells to have the liquid flame retardant physically contact the battery cell components. Contrary to the conventional teaching, the inventors have determined otherwise to maintain the desirable electrochemical characteristics and simultaneously suppress any undesired fires or sparks.

SUMMARY OF THE INVENTION

A fire suppressant battery system has a battery pack, a non-conductive fire suppressant liquid in a fire suppressant bladder, and a fire suppressant protective layer. The bladder melts at a temperature above the battery pack's desired operating condition, has a cavity for receiving the liquid and contacts at least a section of the battery pack. The protective layer is positioned onto a portion of the fire suppression bladder's exterior surface that is on the opposite side to that which contacts the battery pack. The protective layer should apply minimal pressure to the battery pack while keeping the fire suppressant bladder as close to the battery pack as possible, so that the fire suppressant battery system (a) decreases (i) the damage from a fire from the battery pack or (ii) the temperature of the battery pack that is at a temperature above the desired operating condition, and (b) contains any shrapnel or other debris from the battery pack.

DETAILED DESCRIPTION OF THE INVENTION

Electrochemical cells or batteries in numerous external configurations are well known. A battery will generally provide energy at a given voltage over much of its life, with the voltage dependent upon the particular electrochemical reactions at the electrodes within the battery.

It is also well known that the electrodes of batteries may be connected together (a) in series to produce an output voltage that is greater than a single battery voltage, (b) in parallel to produce a higher current capacity than the single battery voltage, or (c) in combinations thereof. Absent any special provisions in the batteries, the series and/or parallel connections must be made with external wiring or other electrical connections, which is cumbersome and unreliable.

In spite of these features and the above-identified flame/spark problems, it is typically possible to connect one or more batteries together improperly, such that the combination produces no voltage, an undesired voltage, and/or reverse charging of one or more of the batteries. In the worst case, the errant connection may cause short circuiting of the batteries. This is a dangerous condition, which can result in fire, sparks, explosion, the release of toxic chemicals, and the propulsion of shrapnel from the batteries' casing, all of which may damage property and injure personnel. The current invention is directed to suppressing fires, sparks, and shrapnel debris from electrochemical cells and if possible, lower the electrochemical cell's temperature prior to those events occurring to decrease those events from even occurring.

For a general understanding of the present invention, reference is made to the drawings. In the drawings, like reference numerals have been used throughout to designate identical elements. Additionally, the description identifies certain battery components and/or structures with the adjectives "top," "upper," "bottom," "lower," "side," etc. It is noted that the battery and battery pack are interchangeable and orientations shown in the drawings are arbitrary, and that these adjectives are provided for the sake of clarity in the description. The adjectives are not to be construed as limiting the modular batteries or battery packs to use in a particular spatial orientation. The modular batteries and battery packs may be used in orientations other than those shown and described herein.

Electrochemical Cells

Figure 1:
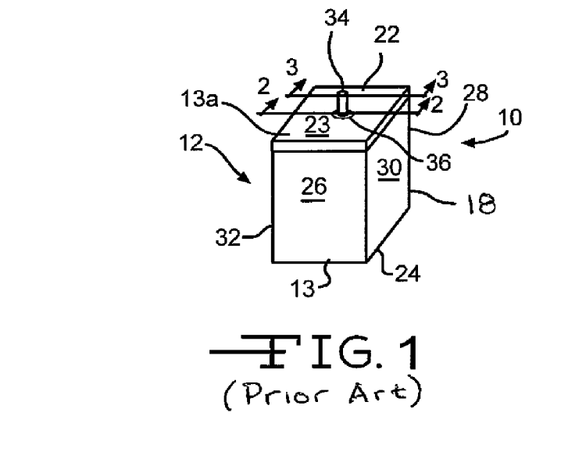
FIG. 1 illustrates a perspective view of a conventional battery.
Figure 2:
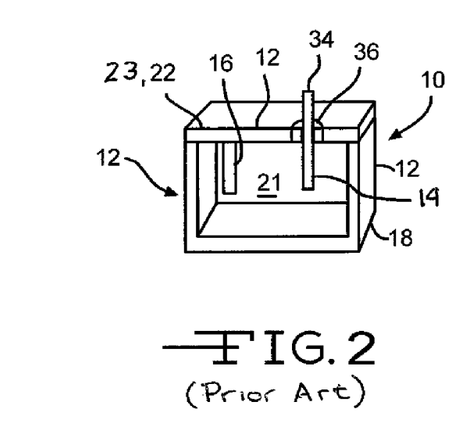
FIG. 2 illustrates a cross-sectional view of FIG. 1 taken along the lines 2-2.

Referring first to FIG. 1, there is provided a modular battery 10, multiples of which can be further combined in series and/or parallel combinations to provide battery packs having desired voltages and current capacities. A modular battery 10 as illustrated at FIG. 2, is comprised of a first electrode of a first polarity 14 and a second, opposite electrode of a second polarity 16 contained within a casing 12. Details regarding the opposite polarity electrodes, and on other electrode configurations and internal series and parallel cell configurations of the battery are known to those of ordinary skill in the art. In general, the present invention is applicable to batteries and battery packs having a broad range of electrode and internal cell configurations. The operative requirement is that the battery or battery pack 10 includes the electrode of a first polarity 14, the electrode of a second, opposite polarity 16, and the casing 12. When the "battery pack" 10 has only a single cathode and anode system, it may be considered simply as a "battery" comprised of one electrochemical cell.

Figure 3:
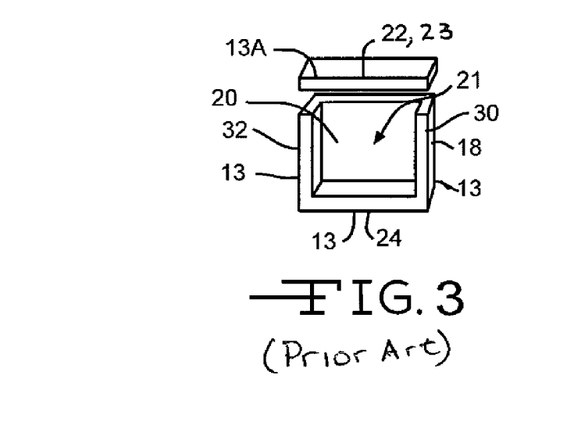
FIG. 3 illustrates an exploded view cross-sectional view of FIG. 1 taken along the lines 3-3.
Figure 4:
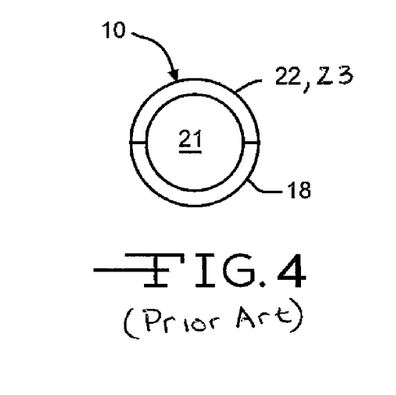
FIG. 4 illustrates an alternative version of FIG. 3 in a non-exploded view.

The casing 12 can have any configuration that conforms to the environment in which it will be used. For example, the casing 12 normally comprises a container 18 with an opening 20 to an electrode cavity 21 and a lid 22 as shown in FIGS. 2 and 3. Once the electrochemical's anode, cathode, optional separator(s), and/or electrolytes are positioned in the electrode cavity 21 through the opening 20, the lid 22 seals, preferably hermetically seals to the container 18 to form the casing 12. The casing 12—which includes the lid 22 positioned, and sealed to the container 18, over the opening 20—can be spherical, cylindrical, polygonical or variations thereof. The casing 12 has to have at least two surfaces, for example as shown in FIG. 4, a top surface 23 mating with a bottom container 18 (or vice versa) that collectively defines the electrode cavity 21.

A common polygonical casing 12 as illustrated at FIG. 1 has the top surface (which can include the lid 22) 23, bottom surface 24, a front side surface 26, a back side surface 28, a right side surface 30, and a left side surface 32 to form a cuboidal shape—all of its surfaces being rectangles—, an essentially cuboidal shape—if the surfaces are (a) nearly flat or (b) convex or concave, and/or all surface angles are not at perfect right angles-, cubic shape or essentially cubic shape. Obviously, the casing 12 can have multiple shapes depending on its environment and number of batteries used when a battery pack is used; the above-identified descriptions are just examples.

Figure 5:
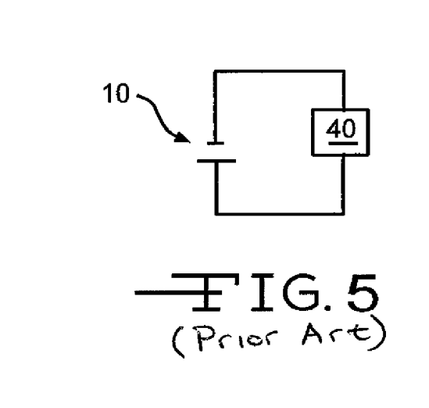
FIG. 5 illustrates an electrical schematic of a conventional, simplified electrical circuit.

As alluded above, an individual battery and a plurality of batteries in a battery pack 10, each typically have the container 18 with the opening 20 sealed by the lid 22 to form the casing 12 for electrical energy storage device. Inside the casing 12 is an anode/cathode electrode assembly 14, 16 activated by an electrolyte. In some embodiments, the container 18 and the lid 22 are of electrically conductive material and serve as a contact for either the anode or the cathode. In a case negative cell, the anode current collector is in contact with the casing while for a case positive design, the opposite is true. The other electrode, the anode or the cathode, not in contact with the casing is connected to a terminal lead or pin 34 that is electrically insulated from the casing 12, for example the electrical insulation can be accomplished by a conventional a glass-to-metal seal 36. When a load 40 is connected to the electrochemical cell(s) 10 as illustrated at FIG. 5, a chemical reaction produces a voltage differential that generates an electrical current to power the load 40. The load 40 can be, for example, a medical device, an oil rig device, an airplane's electrical system, a land vehicle, a water vessel or any other application that uses an electrochemical cell(s).

In a preferred embodiment of what ever casing 12 configuration is desired, the electrochemical cell(s) 10 is a lithium-ion battery. The three primary functional components of a lithium-ion battery are a negative electrode, a positive electrode, and an electrolyte. The negative electrode of a conventional lithium-ion cell is made from carbon. The positive electrode is a lithiated metal oxide, and the electrolyte is a lithium salt in an organic solvent. The electrochemical roles of the electrodes change between anode and cathode, depending on the direction of current flow through the battery cell.

The most commercially popular negative electrode material is graphite. The positive electrode is generally one of three materials: a layered oxide (such as lithium cobalt oxide), a polyanion (such as lithium iron phosphate), or a spinel (such as lithium manganese oxide).

The electrolyte is typically a mixture of organic carbonates such as ethylene carbonate or diethyl carbonate containing complexes of lithium ions. These non-aqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

Depending on material selections, the voltage, capacity, life, and safety of a lithium-ion battery can change dramatically. Recently, novel architectures using nanotechnology have been employed to improve performance. Nevertheless, this invention is not directed to how to make a particular battery.

Fire Suppressant Technology

Figure 6:
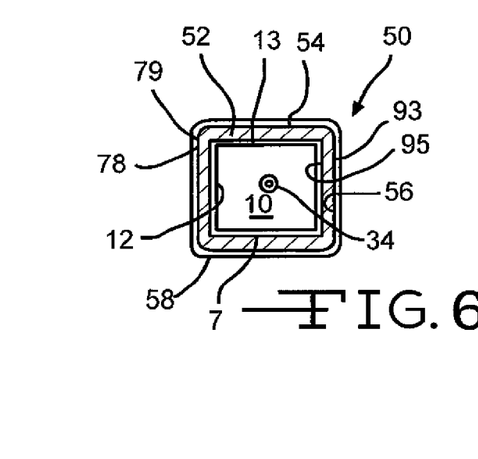
FIG. 6 illustrates a top view of FIG. 1 with a fire suppressant battery system.

The present invention is a fire suppressant device 50 applied to the casing's 12 exterior surface 13. The fire suppressant device 50 has (a) a non-conductive fire suppressant liquid 52 in a dissolvable (non-dissolvable to the non-conductive first suppressant liquid 52) bladder or gel pack 54 to form a first fire suppressant bladder 56 wherein at least a portion of the first fire suppressant bladder 56 (a.k.a., battery contacting surface 95) contacts the casing's 12 exterior surface 13 as illustrated at FIG. 6 (a slight separation is illustrated to assist people to understand and appreciate the distinct elements of the claimed invention), and (b) a fire suppressant protective layer 58 contacts another portion 93 of the first fire suppressant bladder 56—opposite the side that contacts the casing's exterior surface—to provide further fire suppressant characteristics to the fire suppressant device 50, for example minimizing and/or containing a thermal event's fire, spark, increased temperature and shrapnel debris, and to insure the first fire suppressant bladder 56 contacts the casing's 12 exterior surface 13.

An example of the non-conductive fire suppressant liquid 52 is any conventional non-aqueous liquid for fire or explosion suppression. The liquid 52 may be ddodecafluoro-2-methylpentan-3-one [$CF_3CF_2C(O)CF(CF_3)_2$] which is commonly sold under the trade mark NOVEC 1230 and allegedly made by the 3M Corporation or its equivalents which include and are not limited to 1,1,1,2,3,3,3-Heptafluoropropane ($CF_3$—CHF—$CF_3$), a mixture of 50% argon (Ar) and 50% nitrogen ($N_2$); fluoroform [$CHF_3$], bromochlorodifluoromethane [$CF_2ClBr$], bromotrifluoromethane [$CBrF_3$]; a mixture of 52% nitrogen, 40% argon, and 8% carbon dioxide; and a gaseous solution of 60-80% tetrafluoroethane, 10-30% pentafoluoroethane and 10-30% carbon dioxide ($CO_2$). Obviously alternative non-conductive first suppressant liquids known to those of ordinary skill in the art that perform similarly to the above-identified materials can be used with the current invention.

Figure 7:
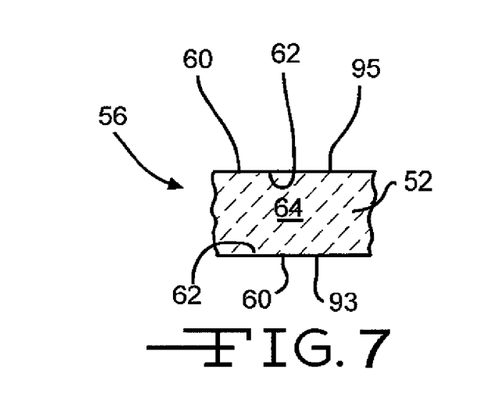
FIG. 7 illustrates an exploded view of FIG. 6 taken from box 7.
Figure 8:
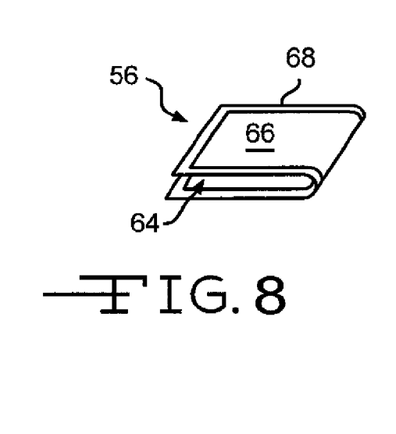
FIG. 8 illustrates one embodiment of making a fire suppressant bladder used in the fire suppressant battery system.
Figure 9:
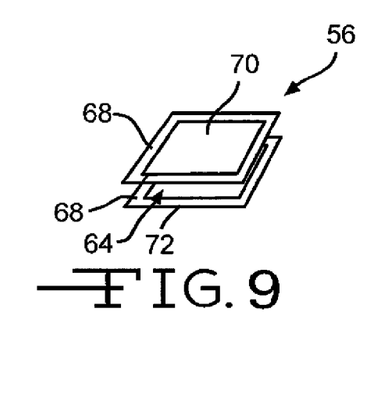
FIG. 9 illustrates an alternative version of FIG. 8.

The first fire suppressant bladder 56 has an exterior surface 60 and an interior surface 62 as illustrated at FIG. 7. The interior surface 62 defines a cavity 64 that receives the non-conductive fire suppressant liquid 52. The bladder 56 can be formed by (a) one bladder-type material 66 folded-over and sealed (conventional sealing methods include heat, sonic or adhesives) together at (or near) its border periphery 68 or alternative locations, described below, to form the liquid cavity 64 to contain the non-conductive fire suppressant liquid 52 (see FIGS. 6, 7 and 8); or (b) two or more of the same or different materials 70, 72 sealed (same as above) together preferably at (or near) its border periphery 68 or alternative locations, described below, to form the liquid cavity 64 (see FIGS. 6, 7 and 9). As identified above, the material(s) 66, 70, 72 are non-dissolvable in relation to the non-conductive fire suppressant liquid 52 and dissolvable in relation to the electrolyte in the battery or battery pack 10. The materials 66, 70, 72 are also selected to melt at a temperature when the battery or battery pack 10 is above its desired operating range, and most preferably when the battery's temperature is just before or at a temperature when the battery pack 10 will have adverse effects—for example burning, sparks or explosion.

Obviously, the materials 66, 70, 72 can be various and different materials depending on the non-conductive fire suppressant liquid 52, the battery's electrolyte, the battery components flammability temperature, and the operating condition in which the battery or battery pack 10 is to be used. That being said, when a conventional lithium-ion battery is used at room temperature, high altitudes and cold temperatures (a.k.a., in flight, landing, taxing, or a landed airplane), an acceptable fire suppressant bladder 56 material 66, 70, 72 is a polymeric or rubber material, which includes polyethylene.

Figure 10:
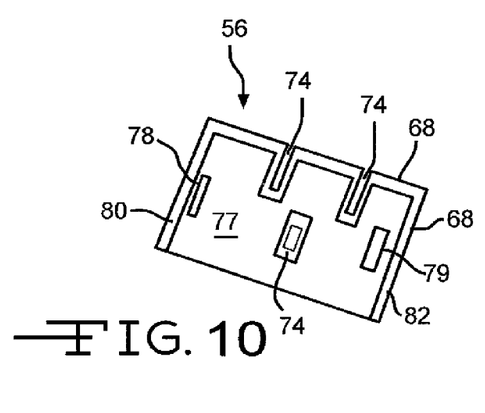
FIG. 10 illustrates an alternative version of the fire suppressant bladder used in the fire suppressant battery system.
Figure 11:
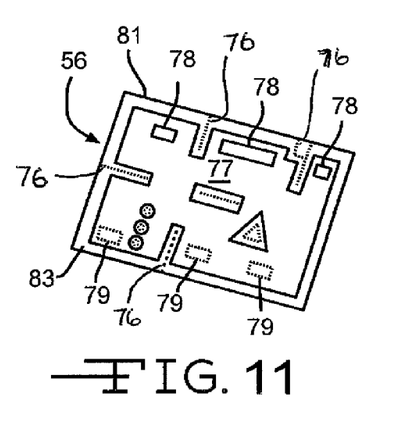
FIG. 11 illustrates an alternative version of the fire suppressant bladder used in the fire suppressant battery system.

To adapt to various sized battery and battery packs 10 and lead(s) 34, the fire suppressant bladder 56 may have slits 74 extending from the bladder's periphery 68 into the interior bladder area 77 as illustrated at FIG. 10, and/or in the interior bladder area 77. Those slits 74 can be formed when the bladder 56 is manufactured (as illustrated at FIG. 10) or formed from perforations 76, as illustrated at FIG. 11, when desired or needed. As illustrated, the slits 74 or perforations 76 can be any size or shape. The slits/perforations 74, 76 are positioned within a sealed (heat, sonic or adhesives) area—same or different method in which the periphery 68 is sealed.

Figure 12:
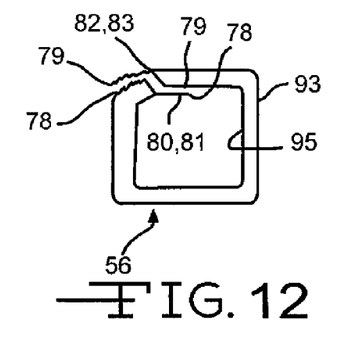
FIG. 12 illustrates the fire suppressant bladder configuration used in the fire suppressant battery system illustrated in FIG. 6.
Figure 13:
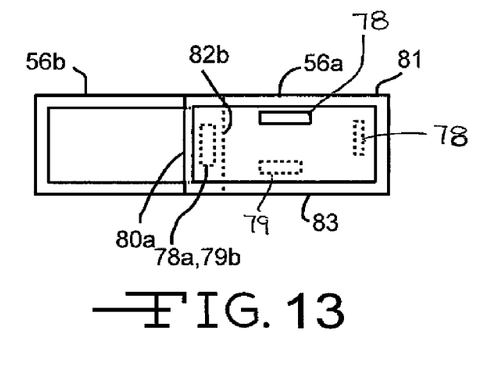
FIG. 13 illustrates an alternative version of a fire suppressant bladder configuration using a first fire suppressant bladder interconnected to a second fire suppressant bladder.
Figure 14:
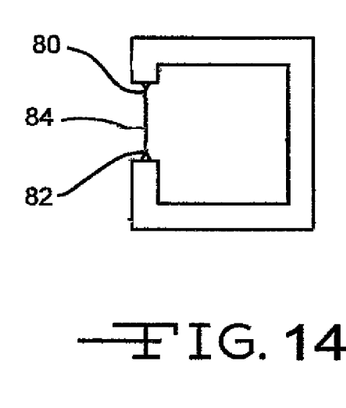
FIG. 14 illustrates an alternative embodiment of FIG. 12.

To also adapt to various sized battery and battery packs 10, the fire suppressant bladder 56 may also have (1) a first connecting—for example and not limited to a hook material, button(s), clip(s), clasp(s), snap button(s), adhesive(s)—material 78 at or near a distal end 80 and/or a top end 81 and (2) a second connecting—that attaches to a corresponding connecting structure, which could include the first connecting material 78—material 79 at or near a proximal end 82 and/or a bottom end 83 as illustrated at FIGS. 10, 11, and 13. Obviously, the locations of the first and second connecting material 78, 79 can be on, at or near different ends than identified immediately above. Moreover, the first and second connecting materials 78, 79 can be on the same surface side as illustrated at FIG. 10, different surface sides as illustrated at FIGS. 11 and 13, or both surface sides as illustrated at FIG. 12.

Figure 15:
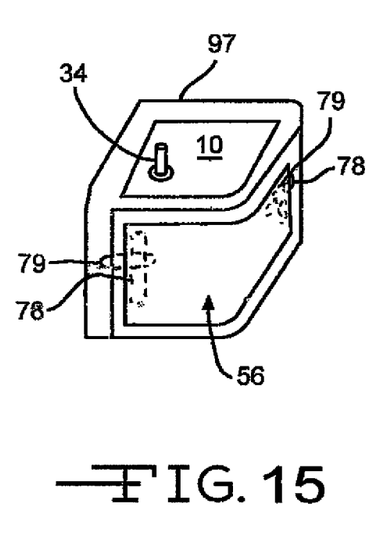
FIG. 15 illustrates an alternative embodiment of FIG. 6.

The first connecting material 78, 78a provides an opportunity for a first fire suppressant bladder 56, 56a to have one end 80, 81 attach to the opposing end 82, 83 as illustrated at FIG. 12; or to a second connecting material 79b on a second first suppressant bladder 56b (or a plurality thereof) as illustrated at FIG. 13 or to corresponding connecting materials positioned on a structure(s) 97 that surround at least a portion of the battery or battery packs 10 (see FIG. 15) in order for the fire suppressant bladder(s) 56, or first and second fire suppressant bladder(s) 56a, 56b to eventually be positioned on, around, about, or below the battery or battery packs 10.

Alternatively, a resilient flexible material 84, like elastic fabric, can be positioned between the terminal ends 80, 82 to allow the first fire suppressant bladder 56 to be stretched on, around, about, or below and contact the battery pack 10.

The first fire suppressant bladder 56 with or without the other attachments, 78, 79, 84 forms the desired bladder configuration that contacts at least a portion of the battery pack 10, in particular the casing's 12 exterior surface 13 and/or the lid's 22 exterior surface 13a.

However the fire suppressant bladder 56, or first and second fire suppressant bladder(s) 56a, 56b, is positioned about the battery or battery pack 10, the fire suppressant bladder(s) 56, 56a, 56b is further secured to the battery or battery pack 10 by the fire suppressant protective layer 58. An example of the fire suppressant protective layer 58 is, for example, poly-paraphenylene terephthalamide or equivalent aramid or para-aramid fiber products, with an adhesive on the surface that contacts a portion of the exterior surface 60, 93 of the fire suppressant bladder(s) 56, 56a, 56b that does not contact the battery pack 10 (the contacting surface is item 95—see FIG. 6) and simultaneously applies sufficient pressure to the first suppressant bladder(s) 56, 56a, 56b to have the exterior surface 60, 95 of the fire suppressant bladder(s) 56, 56a, 56b remain in contact with the battery pack 10 (see FIG. 6).

The fire suppressant device 50 positioning on, around, about, or below the battery or battery packs 10 depends on what is located next to the respective battery or battery packs 10 and where the battery or battery packs 10 is positioned in an electrical system.

For example, if the battery or battery packs 10 is positioned in a tight-fitting case, the fire suppressant unit 20 can be positioned on selected portions or essentially the entire top surface (which includes the lid 22) 23. Essentially the entire top surface 23 is defined because there may be an opening for the terminal lead or pin 34 that directs an electrical current from the battery pack 10 to a load 40 and the load 40 to the battery pack 10, see FIG. 5). The load 60 can be anything that the battery pack 10 provides an electrical current.

If the battery or battery packs 10 is positioned in a location that exposes a side surface (which could include surfaces 26, 28, 30, 32), then the fire suppressant device 50 can be positioned on the exposed side surface; and if possible on the top surface 23, as described above, or, on the bottom surface 24.

If a vent or any other part of the battery or battery packs 10 opens, the resulting fire and heat is designed to cause the fire suppressant bladder 56, or first and second fire suppressant bladder(s) 56a, 56b, to open. Thereby releasing the non-conductive fire suppressant liquid 52 onto and around the battery or battery packs 10 to extinguish the fire and hopefully decrease the heat. The fire suppressant protective layer 58 can increase the amount of external pressure that the fire suppressant battery system applies to the battery or battery pack's external surface, and it is preferred that the external pressure applied by the fire suppressant battery system to the battery that or battery pack is minimal and simultaneously (a) keeps the fire suppressant bladder 56, or first and second fire suppressant bladder(s) 56a, 56b, as close to the battery or battery packs 10 as possible, and (b) limits any shrapnel or other debris from exiting the battery or battery packs 10 from locations covered by the fire suppressant bladder(s) 56, 56a, 56b.

While this invention has been described in conjunction with preferred embodiments thereof, it is evident that many alternatives, modifications, and variations will be apparent to those skilled in the art. Accordingly, the present invention is intended to embrace all such alternatives, modifications and variations that fall within the broad scope of the appended claims.

The invention claimed is:

1. A fire suppressant battery system, comprising:
   a) a battery pack, comprising:
      i) at least one casing;
      ii) an anode separated from a cathode by a separator to thereby form an electrode assembly housed in the casing; and
      iii) an electrolyte activating the electrode assembly in the casing;
   b) a fire suppressant bladder comprising a non-conductive fire suppressant liquid contained in an interior bladder space, wherein the fire suppressant bladder comprises an inner bladder surface and an outer bladder surface, and wherein the inner bladder surface surrounds the at least one casing; and
   c) a fire suppressant protective layer surrounding the outer surface of the fire suppressant bladder,
   d) wherein upon the battery pack experiencing a heat event, the fire suppressant bladder is configured to melt and release the non-conductive fire suppressant liquid onto the at least one casing with the fire suppressant protective layer helping to prevent shrapnel should the at least one casing rupture.

2. The fire suppressant battery system of claim 1 wherein the non-conductive fire suppressant liquid is selected from the group consisting of dodecafluoro-2-methylpentan-3-one [$CF_3CF_2C(O)CF(CF_3)_2$]; 1,1,1,2,3,3,3-Heptafluoropropane ($CF_3$—CHF—$CF_3$), a mixture of 50% argon (Ar) and 50% nitrogen ($N_2$); fluoroform [$CHF_3$]; bromochlorodifluoromethane [$CF_2ClBr$]; bromotrifluoromethane [$CBrF_3$]; a mixture of 52% nitrogen, 40% argon, and 8% carbon dioxide; and a gaseous solution of 60-80% tetrafluoroethane, 10-30% pentafoluoroethane and 10-30% carbon dioxide ($CO_2$).

3. The fire suppressant battery system of claim 1 wherein the fire suppressant protective layer is opposite both the inner bladder surface and the at least one casing.

4. The fire suppressant battery system of claim 1 wherein the fire suppressant protective layer is an aramid or para-aramid fiber product having an adhesive material contacting the outer bladder surface of the fire suppression bladder.

5. The fire suppressant battery system of claim 4 wherein the aramid or para-aramid fiber product is poly-paraphenylene terephthalamide.

6. The fire suppressant battery system of claim 1 wherein the fire suppressant bladder is a polymeric or rubber material.

7. The fire suppressant battery system of claim 6 wherein the polymeric or rubber material is polyethylene.

8. The fire suppressant battery system of claim 1 wherein the fire suppressant bladder has at least a first connecting material that is configured to interconnect to:
   a) a second connecting material on the fire suppressant bladder;
   b) a second fire suppressant bladder having a second connecting material thereon;
   c) a structure having a second connecting material thereon, wherein the structure surrounds at least a portion of the at least one casing of the battery pack; and
   d) combinations thereof.

9. The fire suppressant battery system of claim 1 wherein the fire suppressant bladder has perforations, slots, and combinations thereof.

10. The fire suppressant battery system of claim 1 wherein the fire suppressant protective layer helps maintain the fire suppressant bladder in close proximity to the at least one casing of the battery pack.

11. The first suppressant battery system of claim 1 wherein the battery pack comprises a single battery or a plurality of batteries.

12. The fire suppressant battery system of claim 11 wherein the single battery is a lithium battery.

13. The fire suppressant battery system of claim 11 wherein the battery pack contains at least one lithium battery.

14. The fire suppressant battery system of claim 11 wherein the battery pack is configured to power a load selected from the group consisting of an airplane, an oil rig, a land vehicle, a water vessel, a medical device or any other application that uses an electrochemical cell(s).

15. The fire suppressant battery system of claim 1 wherein the casing comprises a side surface extending to and meeting a top surface and a bottom surface and the fire suppressant bladder contacts at least a portion of the at least one casing's: (a) top surface, (b) side surface, (c) bottom surface, and (d) combinations thereof.

16. A method of assembling a fire suppressant battery system, comprising the steps of:
   a) providing a battery pack, comprising the steps of:
      i) providing at least one casing;
      ii) forming an electrode assembly comprising an anode separated from a cathode by a separator;
      iii) housing the electrode assembly in the casing; and
      iv) activating the electrode assembly with an electrolyte in the casing;
   b) providing a fire suppressant bladder comprising a non-conductive fire suppressant liquid contained in an interior bladder space, wherein the fire suppressant bladder comprises an inner bladder surface and an outer bladder surface;

c) positioning the fire suppressant bladder so that an inner bladder surface surrounds the at least one casing; and d) positioning a fire suppressant protective layer so that it surrounds the outer surface of the fire suppressant bladder so that the fire suppressant protective layer is opposite both the inner bladder surface and the at least one casing, e) wherein upon the battery pack experiencing a heat event, the fire suppressant bladder is configured to melt and release the non-conductive fire suppressant liquid onto the at least one casing with the fire suppressant protective layer helping to prevent shrapnel should the at least one casing rupture.

17. The method of claim 16 including providing the battery pack comprising a single battery or a plurality of batteries.

18. The method of claim 17 including providing the battery pack containing at least one lithium battery.

19. The method of claim 16 including configuring the battery pack to power a load selected from the group of an airplane, an oil rig, a land vehicle, a water vessel, a medical device or any other application that uses an electrochemical cell(s).

20. The method of claim 16 including selecting the non-conductive fire suppressant liquid from the group consisting of dodecafluoro-2-methylpentan-3-one [$CF_3CF_2C(O)CF(CF_3)_2$]; 1,1,1,2,3,3,3-Heptafluoropropane ($CF_3$—CHF—$CF_3$), a mixture of 50% argon (Ar) and 50% nitrogen ($N_2$); fluoroform [$CHF_3$]; bromochlorodifluoromethane [$CF_2ClBr$]; bromotrifluoromethane [$CBrF_3$]; a mixture of 52% nitrogen, 40% argon, and 8% carbon dioxide; and a gaseous solution of 60-80% tetrafluoroethane, 10-30% pentafoluoroethane and 10-30% carbon dioxide ($CO_2$).

21. The method of claim 16 including providing the fire suppressant protective layer as an aramid or para-aramid fiber product having an adhesive material and contacting the adhesive material to the at least one casing.

22. The method of claim 21 including providing the aramid or para-aramid fiber product as poly-paraphenylene terephthalamide.

* * * * *

UNITED STATES PATENT AND TRADEMARK OFFICE
CERTIFICATE OF CORRECTION

PATENT NO. : 9,478,834 B2
APPLICATION NO. : 13/870045
DATED : October 25, 2016
INVENTOR(S) : Todd E. Sweetland et al.

It is certified that error appears in the above-identified patent and that said Letters Patent is hereby corrected as shown below:

In the Claims

Column 10, Line 2 (Claim 2, Line 10) delete "pentafoluoroethane" and insert --pentafluoroethane--

Column 12, Lines 13-14 (Claim 20, Lines 9-10) delete "pentafoluoroethane" and insert --pentafluoroethane--

Signed and Sealed this
Fourteenth Day of February, 2017

Michelle K. Lee
*Director of the United States Patent and Trademark Office*